United States Patent
Lin et al.

(10) Patent No.: US 8,407,159 B2
(45) Date of Patent: Mar. 26, 2013

(54) AUTOMATIC BATCHING OF GUI-BASED TASKS

(75) Inventors: Qingwei Lin, Beijing (CN); Fan Li, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 12/948,353

(22) Filed: Nov. 17, 2010

(65) Prior Publication Data

US 2012/0123975 A1 May 17, 2012

(51) Int. Cl.
G06F 17/00 (2006.01)
G06F 17/20 (2006.01)
(52) U.S. Cl. .......................................... 706/11
(58) Field of Classification Search ....................... 706/11
See application file for complete search history.

(56) References Cited

U.S. PATENT DOCUMENTS

| | | | |
|---|---|---|---|
| 5,717,879 A | 2/1998 | Moran et al. | |
| 5,781,720 A | 7/1998 | Parker et al. | |
| 6,532,023 B1 | 3/2003 | Schumacher et al. | |
| 7,016,049 B2* | 3/2006 | Kurosawa | 356/508 |
| 7,072,733 B2* | 7/2006 | Magee et al. | 700/133 |
| 7,337,428 B2* | 2/2008 | Kipman et al. | 717/100 |
| 7,493,592 B2* | 2/2009 | Karatal et al. | 717/105 |
| 7,523,059 B2* | 4/2009 | Tezuka et al. | 705/36 R |
| 7,526,385 B2* | 4/2009 | Sayers | 702/13 |
| 7,616,834 B2* | 11/2009 | Kramer et al. | 382/276 |
| 8,108,436 B2* | 1/2012 | Chhatrapati et al. | 707/796 |
| 8,160,204 B2* | 4/2012 | Muller et al. | 378/65 |
| 2004/0041827 A1 | 3/2004 | Bischof et al. | |
| 2004/0261026 A1 | 12/2004 | Corson | |
| 2005/0071760 A1 | 3/2005 | Jaeger | |
| 2005/0278728 A1 | 12/2005 | Klementiev | |
| 2006/0005132 A1 | 1/2006 | Herdeg, III | |
| 2006/0010420 A1 | 1/2006 | Peterson et al. | |
| 2008/0282160 A1 | 11/2008 | Tonnison et al. | |
| 2008/0301555 A1 | 12/2008 | Vartiainen et al. | |
| 2009/0063968 A1 | 3/2009 | Wenig et al. | |
| 2009/0172533 A1 | 7/2009 | Hamzaoui et al. | |
| 2009/0172534 A1 | 7/2009 | Budreau et al. | |
| 2009/0172536 A1 | 7/2009 | Cheng et al. | |

OTHER PUBLICATIONS

Bruno et al., "Mini-Me: A Min-Repro System for Database Software", IEEE Proceedings of International Conference on Data Engineering (ICDE), Long Beach, CA, Mar. 2010, pp. 1153-1156.

"gnu xnee", Sandklef GNU Labs, Jun. 26, 2008, pp. 1-2.<<retrieved on Aug. 2, 2010 at <<http://www.sandklef.com/xnee/>>.

Manohar et al., "The Session Capture and Replay Paradigm for Asynchronous Collaboration", Proceedings of Conference on European Conference on Computer-Supported Cooperative Work (ECSCW), Stockholm, Sweden, Sep. 1995, pp. 149-164, Kluwer Academic Publishers.

"Ranorex Recorder", Nov. 18 2007, 3 pages, retrieved on Aug. 2, 2010 at <<http://www.ranorex.com/gui-testing-guide/record-user-actions-mouse-movements-keyboard-inputs.html>>.

(Continued)

Primary Examiner — Michael B Holmes
(74) Attorney, Agent, or Firm — Lee & Hayes, PLLC

(57) ABSTRACT

Described herein are techniques for automatically batching GUI-based (Graphical User Interface) tasks. The described techniques include automatically determining whether a user is performing batchable tasks in a GUI-based environment. Once detected, the described techniques include predicting the next tasks of a batch based upon those detected batchable tasks. With the described techniques, the user may be asked to verify and/or correct the predicted next tasks. Furthermore, the described techniques may include performing a batch and doing so without user interaction.

20 Claims, 4 Drawing Sheets

OTHER PUBLICATIONS

Silverstein, "Logical Capture/Replay", STQE Magazine, Nov./Dec. 2003, pp. 36-42, retrieved on Aug. 2, 2010 at <<http://www.silvermark.com/Library/publications/articles/sqe_logical_capture_replay.pdf>>.

"Working with Automator", Apple Inc., Tiger Developer Overview Series: Mac OS X Tiger, Mar. 6 2006, 6 pages, retrieved on Aug. 2, 2010 at <<http://developer.apple.com/macosx/automator.html>>.

"AI Robot 5.0", freedownloads center, 2 pages, published Mar. 18, 2009, retrieved Aug. 4, 2010 at http://www.freedownloadscenter.com/Utilities/Automation_Utilities/AI_Robot.html.

"Asoftech Automation v2.0.0", FileBuzz, Published Jul. 22, 2009, 2 pages, retrived on Aug. 4, 2010 at http://www.filebuzz.com/fileinfo/55705/Asoftech_Automation.html.

Automation Batch Tools 3.0.1, Top4Download.com, Published Dec. 27, 2009, 3 pages, retrieved Aug. 3, 2010 at http://www.top4download.com/automation-batch-tools/ctqxeiiq.html.

"AutoMe—automate computer tasks", asoftech, published 2006, 2 pages, retrieved Aug. 4, 2010 at http://www.asoftech.com/autome/.

"EnergyKey 2.2", safe-install.com, published May 22, 2006, 6 pages, retrieved Aug. 4, 2010 at http://www.safe-install.com/programs/energykey.html.

"Hot Keyboard 2.7", Safe-install.com, published Nov. 22, 2004, 5 pages, retrieved Aug. 4, 2010 at http://www.safe-install.com/programs/hot-keyboard.html.

Office action for U.S. Appl. No. 12/952,010, mailed on Oct. 3, 2012, Lin et al., "Capture and Playback for GUI-based Tasks", 14 pages.

\* cited by examiner

AUTOMATIC BATCHING OF GUI-BASED TASKS

BACKGROUND

During their daily usage of a computer, users often perform many repetitive tasks that are batchable. An example of batchable tasks includes repeating essentially the same re-size operation on all of the photos in a particular folder on a storage device. A "batchable task" is an operation (e.g., re-size) that is repeated, but where a few aspects (e.g., specific photo file in a folder) vary with each operation. Batchable tasks may include essentially the same action repeated or may involve a repeated pattern of differing actions.

Some surveys have suggested that employees may spend as much as an hour in a typical workday performing repetitive operation, such as batchable tasks. Of course, a computer can be, and often is, programmed to perform batchable tasks. Unfortunately, many users do not possess sufficient technical savvy to program such tasks. Even if a user has the technical savvy to script a series of batchable tasks, many of those savvy users do not bother to take the time to write an appropriate script to perform a batch of the batchable tasks.

Moreover, few, if any, options exists for scripting a series of batchable tasks across multiple applications available on one of the many available GUI-based (Graphical User Interface) Operating System (OS) environments. Present solutions offer application-specific "macro" scripting capabilities within particular applications. For example, an application-specific macro can be run within a word processing application, such as Microsoft® Word. However, as the label suggests, application-specific macros do not operate across multiple applications in a GUI-based OS environment.

Furthermore, no present solution offers a way of automatically determining that a user is performing batchable tasks in a GUI-based OS environment, and then automatically completing a batch started by the user.

SUMMARY

Described herein are techniques for automatically batching GUI-based (Graphical User Interface) tasks. The described techniques include automatically determining whether a user is performing batchable tasks in a GUI-based environment. Once detected, the described techniques include predicting the next tasks of a batch based upon those detected batchable tasks. With the described techniques, the user may be asked to verify and/or correct the predicted next tasks. Furthermore, the described techniques may include performing a batch, and doing so without user interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions, as permitted by the context above and throughout this document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
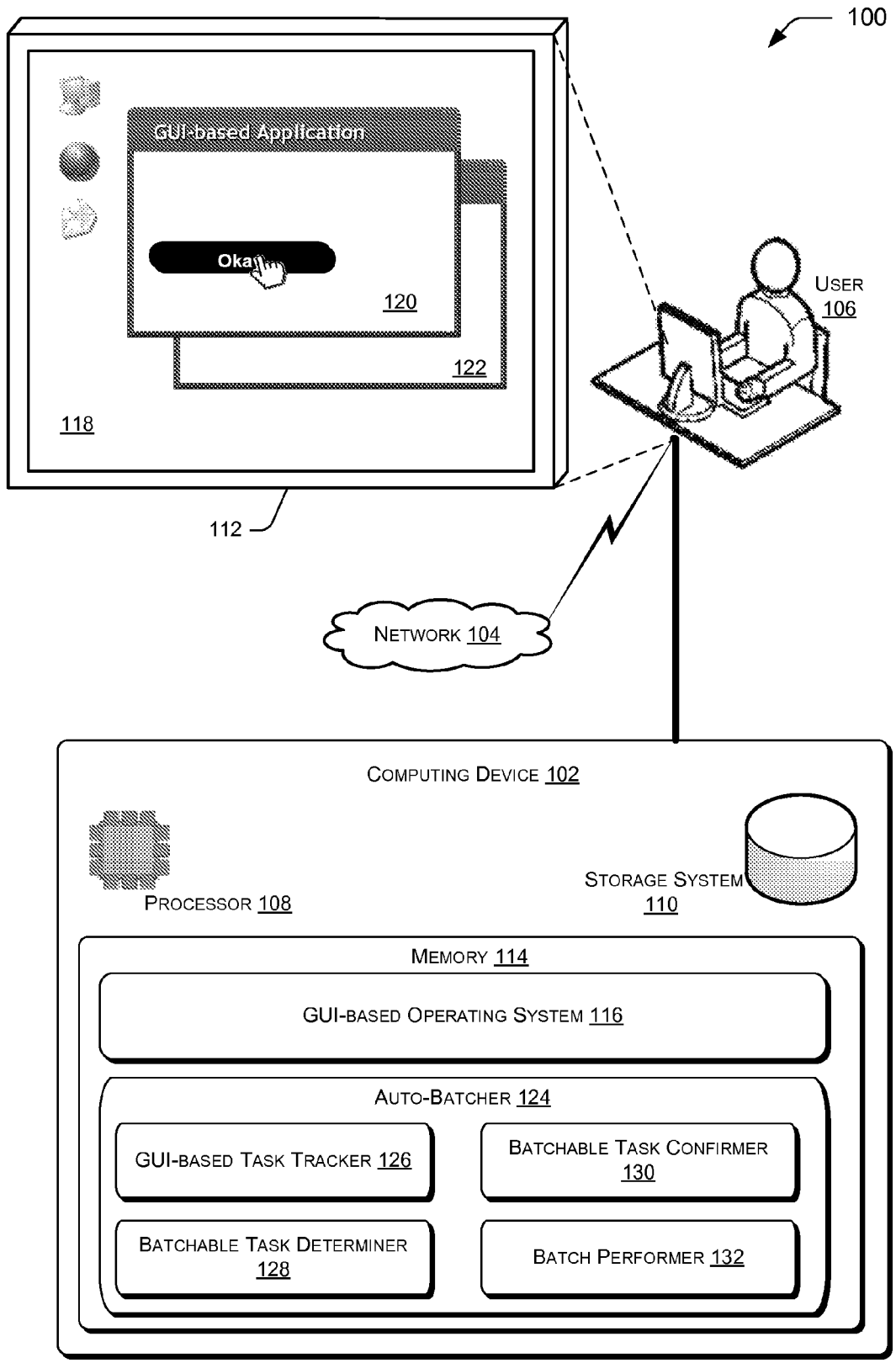
FIG. 1 illustrates an example computing environment that implements techniques to facilitate automatic batching of batchable tasks in a GUI-based (Graphical User Interface) Operating System (OS) environment.

Described herein are techniques for automatically batching GUI-based (Graphical User Interface) tasks. The described techniques include automatically determining whether a user is performing batchable tasks in a GUI-based environment. Once detected, the described techniques include predicting the next tasks of a batch based upon those detected batchable tasks. In other words, after a pattern of batchable tasks is identified, a system using the described techniques may project what one or more of the next few tasks might be.

The user may be asked to verify and/or correct the predicted next tasks. After verification or correction, the described techniques may include automatically (i.e., without user interaction) performing a batch based at least in part upon the corrected or verified next tasks.

The following is an example image "re-sizing" scenario that might illustrate how one or more described techniques may be implemented. In this example scenario, a user's computer system has a particular subfolder containing one hundred digital photos. Using the GUI-based OS, the user navigates to view the contents of the particular subfolder. Using a GUI-based image-manipulation application, the user selects the first digital photo in the subfolder and re-sizes the image to meet the user's specific criteria (e.g., perhaps to be better viewed on a smaller display device). With the conventional approach, the user must repeat the re-sizing task one hundred times (i.e., once for each digital photo). Each of the iterations of the re-sizing task is essentially the same as each of the other iterations. The only differences between iterations are a few details, such as the name of the particular digital photo being re-sized in that iteration.

If the user is sufficiently trained, the user could write a short script or generate an application-specific macro to perform the re-sizing task one hundred times to process the one hundred digital photos in the subfolder. Most users do not have the skills to write such a script, and those that do have the skills may not want to take the time to write such a script because it might take nearly as long to write as it would to manually perform the repetitive tasks.

With at least one described implementation, a configured system tracks the GUI-based re-sizing tasks as the user manually performs each task. Once it identifies a pattern of tracked tasks, the system determines that the tasks of the pattern are capable of being batched. Such tasks are called "batchable tasks" herein. Since the user appears to be selecting digital photos in a particular subfolder, it is likely that the user intends to re-size each of the remaining digital photos in that subfolder. The system may predict the next few tasks based upon the repeated pattern and anticipating which of the digital photos are next in the subfolder.

By visually walking the user through the next one or more predicted tasks, the user is given a chance to verify whether the predicted next few tasks are correct. Once verified, the system generates the full batch (based upon the verified prediction) and the batch runs automatically—without manual user input—thereafter. In this example scenario, the remaining digital photos in the subfolder are re-sized without any additional manual input from the user.

Example Computing Environment

FIG. 1 illustrates an example computing environment 100 that may implement the described techniques for automatically batching GUI-based tasks. The environment 100 may include at least one computing device 102, which may be coupled together via a network 104 to form a distributed system with other devices. A user 106 may operate the computer device 102 to conduct work, to search for information, to write an email, to edit a video, to create a business presentation, or other such actions. Although not necessarily illustrated, the computing device 102 has input/output subsystems, such as a keyboard, mouse, speakers, etc. The network 104, meanwhile, represents any one or combination of multiple different types of networks interconnected with each other and possibly functioning as a single large network (e.g., the Internet or an intranet). The network 104 may include wire-based networks (e.g., cable) and wireless networks (e.g., cellular, satellite, etc.).

The computing device 102 of this example computer environment 100 includes one or more processors 108, one or more storage subsystems 110, at least one monitor 112, and one or more memories 114. Running, at least in part, on the computing device 102 is an Operating System (OS) 116 and, in particular, this OS interacts with the user 106 via a Graphical User Interface (GUI). Herein, this OS is called the GUI-based OS 116. An example of a typical GUI-based user interface (UI) 118 of a GUI-based OS 116 is shown on the monitor 112. This example GUI-based UI 118 includes two example GUI-based applications 120 and 122 that might be displayed on such a UI.

FIG. 1 shows a module 124 for automatically batching GUI-based tasks, which is called the auto-batcher 124 herein. This module is shown as residing in the memory 114 as a module of computer-executable instructions. But, of course, in alternative embodiments, the auto-batcher 124 may be implemented in hardware, firmware, or some combination of hardware, software, or firmware. The auto-batcher 124 may be implemented as part of the GUI-based OS 116 or running under or in cooperation with the OS.

As depicted, the auto-batcher 124 includes four modules: a GUI-based task tracker 126, a batchable task determiner 128, a batchable task confirmer 130, and a batch performer 132. Each of these modules is described generally below, but each are discussed in more details in the following section about the auto-batcher 124.

In an on-going basis, the GUI-based task tracker 126 monitors, pre-processes, and records the tasks or actions that the user 106 performs within the GUI-based environment of the GUI-based OS 116. This includes tasks performed with one or more GUI-based applications, such as applications 120 and 122. More particularly, the GUI-based task tracker 126 tracks the user's actions across multiple GUI-based applications. Tracked actions may include for example, clicking on a button, double-clicking on an icon, selecting an item in a list, entering values in an input box, right-clicking, and the like.

The GUI-based task tracker 126 pre-processes the tracked tasks to organize and identify them. In addition, the GUI-based task tracker 126 stores the tracked and/or pre-processed tasks in the memory 114 and/or the storage system 110.

In an on-going basis, as the tasks are tracked, the batchable task determiner 128 detects whether batchable tasks have been performed by the user 106. The batchable task determiner 128 detects a pattern of repeated tasks in the incoming stream of tracked tasks. Once it indicates that a set of repeated tasks may be batchable, the batchable task determiner 128 predicts a forthcoming sequence of variant portions of future iterations of the batchable tasks.

The batchable task confirmer 130 has the user 106 verify the determined batchable tasks and the predictions about the forthcoming sequence of variable portions of such tasks. Also, the batchable task confirmer 130 may allow the user to correct the predictions.

With a confirmation or correction from the user, the batch performer 132 then generates the remainder of the batch and performs the generated batch automatically (i.e., without user interaction). Indeed, the batch, when performed, may act over multiple GUI-based applications, such as GUI-based applications 120 and 122. That is, the batch may include actions performed on, by, in, or with multiple GUI-based applications.

Example Auto-Batcher

Figure 2:
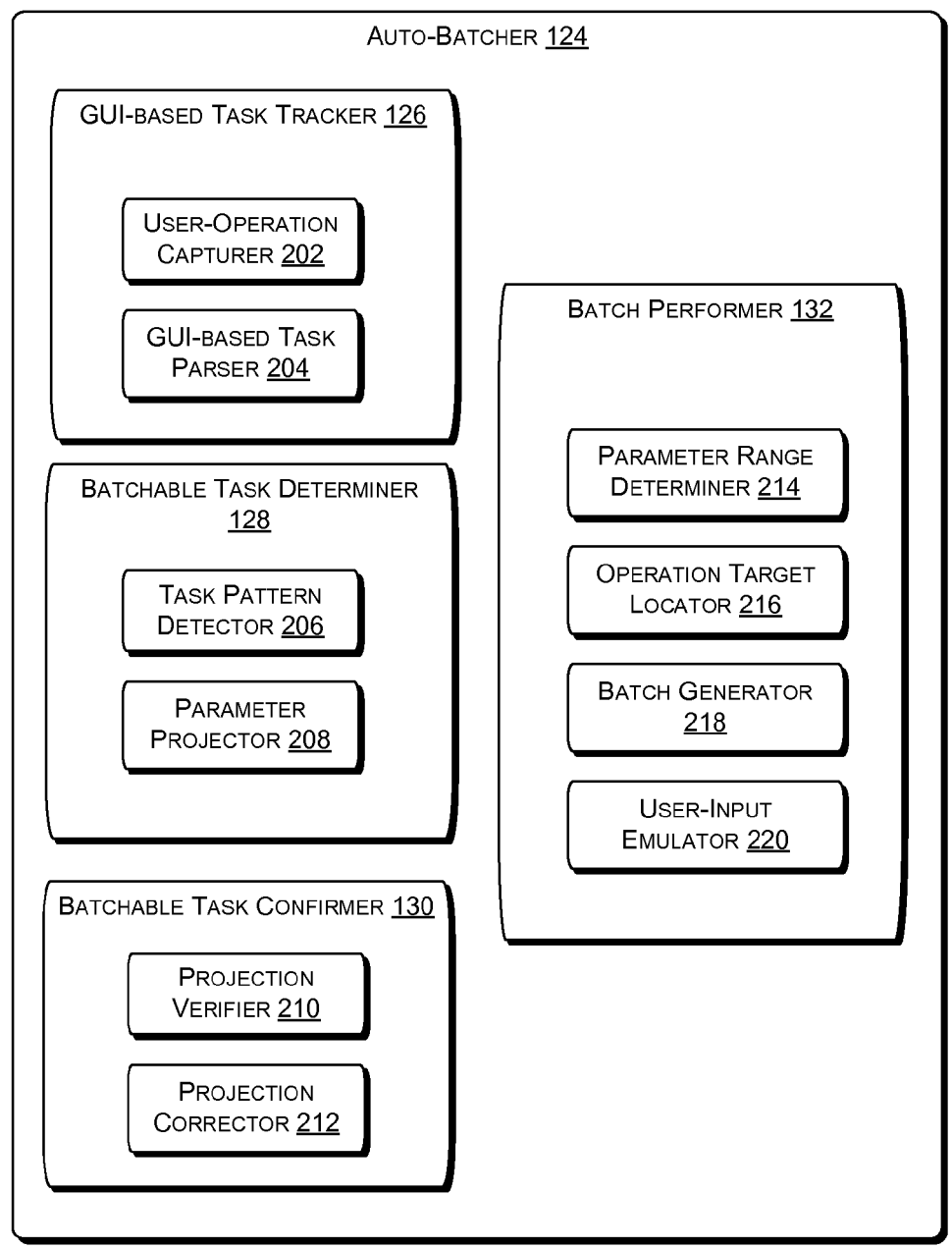
FIG. 2 illustrates in more detail a module configured to implement the techniques described herein to facilitate the automatic batching of batchable GUI-based tasks.

FIG. 2 illustrates more details of at least one embodiment of the auto-batcher 124, which was introduced and briefly described in the context of FIG. 1. As noted above, the auto-batcher 124 includes at least four modules: the GUI-based task tracker 126, the batchable task determiner 128, the batchable task confirmer 130, and the batch performer 132.

The GUI-based task tracker 126 monitors, pre-processes, and records the user's GUI-based tasks. The GUI-based task tracker 126 includes at least two sub-modules: a user-operation capturer 202 and a GUI-based task parser 204.

Generally, the GUI-based task tracker 126 operates in the background of the GUI-based OS 116. Because of this, the user 106 is typically unaware that the user-operation capturer 202 is silently observing and recording the actions performed by the user as she goes about performing various tasks via inputs, such as those from a keyboard and a mouse. Regardless of which application is being used (e.g., GUI-based applications 120 and/or 122), the user-operation capturer 202 may capture all GUI-based tasks of the user. Indeed, the GUI-based task tracker 126 may track the user's actions across multiple GUI-based applications, such as GUI-based applications 120 and 122. Tracked tasks may include inputs from the keyboard, mouse, touchscreen, or other such inputs used for selections of options of GUI-based applications.

Rather than an application-specific function, an OS-wide hook may be used to capture the input (e.g., keyboard and/or mouse) events to implement the described techniques for automatically batching GUI-based tasks. Generally, OS-wide hooks, using application programming interfaces (APIs), identify and store the detail information of a GUI element, such as the element type, element name, and its parent components information. Examples of such APIs are part of the UI automation/accessibility framework, such as Microsoft Active Accessibility (MSAA) and its successor, the Microsoft UI Automation (UIA), each of which is supported by various GUI-based operating systems. Such frameworks are general interfaces for most GUI-based applications and can get the information of basic GUI-based elements, such as the button, link, menu, input box, file, window, etc.

Using GUI-element identification hooks, the user-operation capturer 202 gets information about the GUI-based element (e.g., the button, link, menu, input box, file, window, etc.) that is the subject of the user's GUI-based actions. This GUI-based element is called the operation target.

The user-operation capturer 202 detects, tracks, and records the operation types (e.g., the mouse/keyboard events) and operation element (e.g., which button/menu in which window is clicked). With this information, the user-operation capturer 202 stores a unique identification of each user operation in a defined format. Each operation record, as user operation is called, is stored as a combination of the operation type and the operation element. The structure of the operation record enables a unique representation of the operation target and an operation type so as to indicate the user interaction. Implementations may use new or existing formats of the operation records. Suitable existing formats include those offered by MSAA or UIA.

The operation-record format contains the process name, main window information, and frame window information, together with a hierarchy tree structure of the element. For example, the element of an "OK" button in the "Save as . . . " dialog of a specific application called "X" may have the process name "WinX", the main window of "X", frame window to be the "Save as . . . " dialog, and a hierarchy tree structure from the frame window to the "OK" button. With this data structure, the target element may be accessed later when tasks are automatically performed as part of a batch.

The GUI-based task parser 204 receives a series of operation records as such records are being captured by the user-operation capturer 202. The GUI-based task parser 204 analyzes this operation-record sequence to parse the invariant portions of each task from the variant portions. Herein, the invariant portion is called a logkey and the variant portion is called a parameter. The invariant portion of a task includes that portion that remains essentially the same each time the task is repeatedly performed. The variant portion of a task includes that portion that changes each time the task is repeatedly performed. For example, if the repeated task includes re-sizing an image, the actions involving re-sizing are invariant while the specific image being re-sized varies for each repetition of the task.

Below is an expanded view of the "re-sizing" example. An example operation-record sequence of the repetitive task of editing a collection of digital photos with the same "re-size" operation is as follows:

---
Example Operation Sequence 1
---
Double click on a file; name: <u>sea.jpg</u>; index: <u>1</u>; main window: d:\pic; frame window: file list view; . . .
Click on button; name: re-size; button tree: Home - Image - re-size; main window: Paint; Window name: <u>sea.jpg</u>; process: xpaint. . .
. . .
Double click on a file; name: <u>mountain.jpg</u>; index: <u>2</u>; main window: d:\pic; frame window: file list view; . . .
Click on button; name: re-size; button tree: Home - Image - re-size; main window: Paint; Window name: <u>mountain.jpg</u>; process: xpaint . . .
. . .
Double click on a file; name: <u>flower.jpg</u>; index: <u>3</u>; main window: d:\pic; frame window: file list view; . . .
Click on button; name: re-size; button tree: Home - Image - re-size; main window: Paint; Window name: <u>flower.jpg</u>; process: xpaint . . .
. . .
---

In the Example Operation Sequence 1 shown above, the invariant part (i.e., logkey) of each repeated task is shown without the underline. This invariant part indicates the general operation of the task. The variant part (i.e., parameters) is shown with underline. The variant part indicates the specific information among similar repeated operations.

In different types of batchable tasks, the location and arrangement of the logkey and parameters may be different. The logkey and parameters are typically distinguished by comparing and contrasting the operation sub-sequences side-by-side. A sub-sequence is a chronologically adjacent grouping of one or more tasks. For example, in the above Example Operation Sequence 1, through comparing the operation sub-sequences side-by-side, the GUI-based task parser 204 is able to determine the invariant and variant parts among the sub-sequences and label them appropriately as logkey or parameter. The parameters are "1", "sea.jpg," "2", "mountain.jpg," "3", and "flower.jpg." The remainder of each task represents the logkey.

From observed patterns in collected records, the GUI-based task parser 204 may be pre-programmed to look at some fixed locations for potential parameters, which can assist in separating the logkey and parameters. Some of the known fixed locations for potential parameters include (by way of example only and not limitation):

The file name segment;
The index;
The value of an element;
The user input value;
The items in a list; or
The items in a selection menu.

By separating the logkey and parameters, the GUI-based task parser 204 generates a logkey sequence. From this, the GUI-based task parser 204 may map the essentially same logkeys to the same identification (e.g., ID) label. In this way, the above Example Operation Sequence 1 is mapped into this ID sequence:

---
ID1
ID2
. . .
ID1
ID2
. . .
ID1
ID2
. . .
---

Similarly, the GUI-based task parser 204 may map the parameters. In this way, the above Example Operation Sequence 1 is mapped into this parameter sequence:

---
Name: <u>sea.jpg</u>; index: <u>1</u>
Window name: <u>sea.jpg</u>
. . .
Name: <u>mountain.jpg</u>; index: <u>2</u>
Window name: <u>mountain.jpg</u>
. . .
Name: <u>flower.jpg</u>; index: <u>3</u>
Window name: <u>flower.jpg</u>
. . .
---

Using the captured and pre-processed operation sequence from the GUI-based task tracker 126, the batchable task determiner 128 detects batchable tasks and attempts to anticipate the operations that the user might perform next in the batch. The batchable task determiner 128 includes at least two sub-modules: a task pattern detector 206 and a parameter projector 208.

The task pattern detector 206 uses the logkey sequence, generated here by the GUI-based task parser 204, to detect the repetition pattern of sub-sequences inside the operation sequence. When such a pattern is detected, the tasks in that sub-sequence pattern are batchable. That is, the tasks of a detected pattern are capable of being batched.

The task pattern detector 206 determines that there is a pattern in the sequence when it detects at least two chronologically adjacent sub-sequences having the same set of logkey IDs. In other words, the task pattern detector 206 declares a pattern when the operation sequence shows at least two sets of sub-sequent tasks in succession having the same repeated pattern of logkey IDs.

Some implementations may employ a classical repetition detection approach, called the Karp-Miller-Rosenberg (KMR) algorithm, to detect the repetition pattern inside a long sequence. To illustrate further, consider this Example Operation Sequence 2: [ID1, ID2, ID3, ID4, ID5, ID2, ID3, ID4]. Using the classical repetition detection approach, the task pattern detector 206 detects the repetition pattern of sub-sequence [ID2, ID3, ID4] of the Example Operation Sequence 2 and that pattern has a repetition length of three. If the next operation in the Example Operation Sequence 2 is ID5, then the task pattern detector 206 detects the following as the repetition pattern: [ID2, ID3, ID4, ID5].

In some implementations, the task pattern detector 206 may use the classical repetition detection approach with some constraints for filtering results. Those constraints may include:

Timeliness Constraint: Since the operation sequence is being analyzed in real or near real time, a pattern is declared when the sub-sequence at the end of the sequence being analyzed is part of the pattern.

Batchability Constraint: To be designated a pattern, the repeated sub-sequences are adjacent to each other. That is, if there are other operations between two otherwise identical sub-sequences, then the two sub-sequences are not designated as a pattern.

To illustrate the affect of the timeliness constraint, consider this Example Operation Sequence 3: [ID1, ID2, ID3, ID1, ID2, ID3, ID1, ID2, ID3, ID6, ID5, ID2, ID4, ID7, ID6, ID2]. Based upon the timeliness constraint, the task pattern detector 206 does not detect a pattern in the Example Operation Sequence 3 because the end of the sequence does not include any pattern. The pattern of [ID1, ID2, ID3] exists in the sequence, but since it is not at the end of the sequence being analyzed, it is not designated a pattern. The imposition of this timeliness constraint prevents the task pattern detector 206 from detecting a pattern of tasks that the user is no longer performing and, thus, is probably not interested in.

To illustrate the affect of the batchability constraint, consider this Example Operation Sequence 4: [ID1, ID2, ID3, ID8, ID1, ID2, ID3, ID7, ID1, ID2, ID3, ID6, ID1, ID2, ID3]. Based upon the batchability constraint, the task pattern detector 206 does not detect a pattern in the Example Operation Sequence 4 because an operation (e.g., ID8, ID7, or ID6) intercedes the repeated pattern of [ID1, ID2, ID3]. The imposition of this batchability constraint helps ensure that the task pattern detector 206 detects patterns that are worthwhile to batch. The intercession of non-repeating tasks (e.g., ID8, ID7, or ID6) between repeating patterns means that any resulting batch would be short and, thus, the user would save little time using such a batch.

Once a pattern is detected, the parameter projector 208 then predicts the parameters of the future operations in the anticipated batch. That is, the parameter projector 208 projects what the next parameters will be for one or more of the next operations that the user has not yet performed. That includes predicting the specific values expected for the parameters of forthcoming iterations of the batchable tasks. In some implementations, the parameter projector 208 may make these predictions based upon the category or classification of the parameters and/or tasks.

Based upon a defined set of assumptions or rules for a class of parameters, the parameter projector 208 may project the expected values of the parameters. For example, when the parameter is a file name and two or three files of a specified folder have been the subject of the tasks thus far, a reasonable rule or assumption might predict that the remaining files in that folder may be the subject of the batch. These rules or assumptions may also be called parameter sequences herein.

The following are examples of some parameter sequences that the parameter projector 208 may use (by way of example only and not limitation):

Number increasing/decreasing. For example, 1, 2, 3, 4, 5 . . . ; or 100, 99, 98, 97 . . . .

Number increasing/decreasing with a fixed value. For example, 1, 3, 5, 7, 9 . . . .

Characters increasing/decreasing. For example, a, b, c, d . . . ; or A, B, C, D . . . .

Month, week date increasing/decreasing. For example, Monday, Tuesday, Wednesday . . . .

Value mappings inside the parameters. For example, the file saving name can be the same or similar to the file opened name.

Value mappings inside the parameters with predictable changes. For example, the file-saving name may have a fixed-change from the file opening name.

Any combination of the above rules.

The parameter projector 208 may be pre-loaded with a set of useful known parameter sequences. In addition, the user 106 may be offered an opportunity to customize the existing parameter sequences and/or generate new parameter sequences to match her needs. The predefined, user-customized, and/or user-generated parameter sequences are stored in the memory 114 and/or storage system 110 of the computer device 102.

Once a pattern is detected and the parameters are projected, the batchable task confirmer 130 confirms the predicted batchable tasks with the user 106 or allows the user to correct the predictions. The batchable task confirmer 130 includes at least two sub-modules: a projection verifier 210 and a projection corrector 212.

The projection verifier 210 notifies the user that an "autobatch" is available for verification. This notification may be accomplished via any one of several suitable mechanisms. For example, an icon may appear in a status tray, a specific audible notification may sound, and/or a dialog box may appear on screen.

In response to the notification, the user may choose to engage in the verification process. As part of that process, the projection verifier 210 visually steps the user through the projected next tasks in the batch. That is, the projection verifier 210 shows the user, on screen, what the next action is that the user would have performed as part of the detected repeated pattern of tasks.

To illustrate how the projection verifier 210 may perform its verification, presume that the repetition pattern is [ID1, ID2, . . . , IDn] and the predicted parameters are [P1, P2, . . . , Pn]. From this, the predicated combination is represented by this operation sequence: [(ID1, P1), (ID2, P2), . . . , (IDn, Pn)]. With that predicted operation sequence, the projection verifier 210 locates the next operation target (e.g., a drop-down list in a particular application) and highlights the operation elements (i.e., a particular element) of the predicted future operations. For example, if the next operation target is an input box, the projection verifier 210 locates that input box and shows the predicted value in the box.

The projection verifier 210 may get verification from the user via a conventional user-input dialog box. Alternatively, the projection verifier 210 may get verification from the user by how the user interacts during the visual presentation of the projected next target operation. It may be presumed that the user agrees or disagrees with the anticipated batch task by how the user follows or fails to follow a visual simulation of the anticipated batch task. Here, "following" may include the user providing coordinating user input, such as the user-controlled cursor moving near or along with the simulated cursor controlled by the projection verifier 210.

With one or more implementations, the batch verifier may draw a colored shape (e.g., red rectangle) around the located GUI element that is the target of the projected target operation. This colored shape highlights the target operation and acts as a guide to the user. If the user does not follow the highlighted target to do the operations for a defined number of steps (e.g., three steps), then the projection verifier 210 may assume that the prediction is wrong and guidance ends.

If the prediction is wrong, the projection corrector 212 may ask the user to correct the projection. The user may do this, for example, by modeling the missing or incorrect GUI-based tasks or by correcting the parameter sequence used by the parameter projector 208. Once corrected, the parameter projector 208 may generate a new projection based upon the correction.

If the user follows the highlight target and the predicted values to do the operations for one task or a major part of one task, then the projection verifier 210 concludes that the prediction is correct. In this case, the projection verifier 210 may ask the user to confirm whether to automatically complete the succeeding tasks (e.g., the batch) on her behalf.

Instead of verifying or correcting, if the user ignores the notification or does not confirm the projections, then the present projections are discarded. However, the user may be notified again once a new projection is ready based upon the existing or a newly detected pattern of GUI-based tasks.

With the user's confirmation or correction, the batch performer 132 performs the batch based upon the verified or corrected projections (or more simply, the "confirmed projections"). The batch performer 132 includes at least four sub-modules: a parameter range determiner 214, an operation target locator 216, a batch generator 218, and a user-input emulator 220.

The parameter range determiner 214 detects and confirms the range of the parameters. Based upon context, the parameter range determiner 214 may detect the range or upper/lower limits of the parameters. For example, by noticing that there are fifty digital photos in a target subfolder, the parameter range determiner 214 may determine that these fifty digital photos form the range or limit for the parameter. Then, the parameter range determiner 214 may ask the user to confirm this detected range. The user also has a chance here to correct the range if the detected range is not what the user desires. Alternatively, the user may just be asked for the range without any detection being performed.

To mimic the user actually performing the remaining part of the batch tasks, the operation target locator 216 locates the target elements of the operations of the generated batch. That is, the location of the target element (e.g., buttons, input boxes, etc.) is determined within a relative context. As opposed to an absolute context (e.g., coordinates of pixels on a screen or in a window), the relative context is where a particular element is located regardless of its absolute location. For example, a particular button may be located regardless of where it is on a screen at the time.

To illustrate, consider this repetition pattern [ID1, ID2, . . . , IDn] and this predicted parameter set [P1, P2, . . . , Pn]. When the two are combined, this predicted set of operations is generated: [(ID1, P1), (ID2, P2), . . . , (IDn, Pn)]. The operation target locator 216 maps each of these IDs back to a logkey (i.e., the invariable part of a GUI-based task). The operation target locator 216 generates an operation record by adding the parameters (Pn) to the IDs. Herein, this is called the predicted operation record. The predicted operation records may be formatted in accordance with the operation-record format discussed above. Each predicted record uniquely represents its operation target, together with an operation type to indicate the user interaction.

Within the operation-record format, each predicted operation record includes the process name, main window information, frame window information, and a hierarchy tree structure of the element. With this data structure, the target element on the system can be found. The operation type is used to indicate the user interaction, such as a right-click, left-click, double-click, drag, mouse move, keyboard input, etc.

With the predicted operation record, the batch generator 218 generates a predicted operation sequence, which may be called the predicted batch. The predicted batch may be stored in the memory 114 and/or storage system 110 of the computer device 102.

When each GUI-based task of a predicted operation record is preformed, the user-input emulator 220 mimics the appearance of a user controlling the input. This user-input emulation is more pleasing to the user and provides the user with feedback regarding what actions are taking place automatically. Exactly what occurs depends upon the operation type of the operation target of the predicted operation record being automatically performed for the user.

Consider these examples:

If the operation being performed is a click operation (e.g., left-click, right click, or double-click), the user-input emulator 220 determines the distance between the current mouse position and the target element. The user-input emulator 220 then inserts proper mouse moves and directs the mouse to move from its current position to the target element. At that point, the user-input emulator 220 generates a mouse click event on the element.

If the operation being performed is a move operation, the user-input emulator 220 generates the move events for smooth control.

If the operation being performed is a drag, the user-input emulator 220 moves the mouse to the target element and generates a left mouse down event. At that point, the user-input emulator 220 moves to the destination and generates a left mouse up event.

If the operation being performed is a keyboard operation, the user-input emulator 220 will directly send the input value to the target input area.

The user-input emulator 220 may implement the click/double-click/move operations by generating system-level mouse events. For example, a click consists of one mouse down and one mouse up with a proper time interval, and a double-click consists of a first mouse down, a first mouse up, a second mouse down, and a second mouse up.

Example Processes

Figure 3:
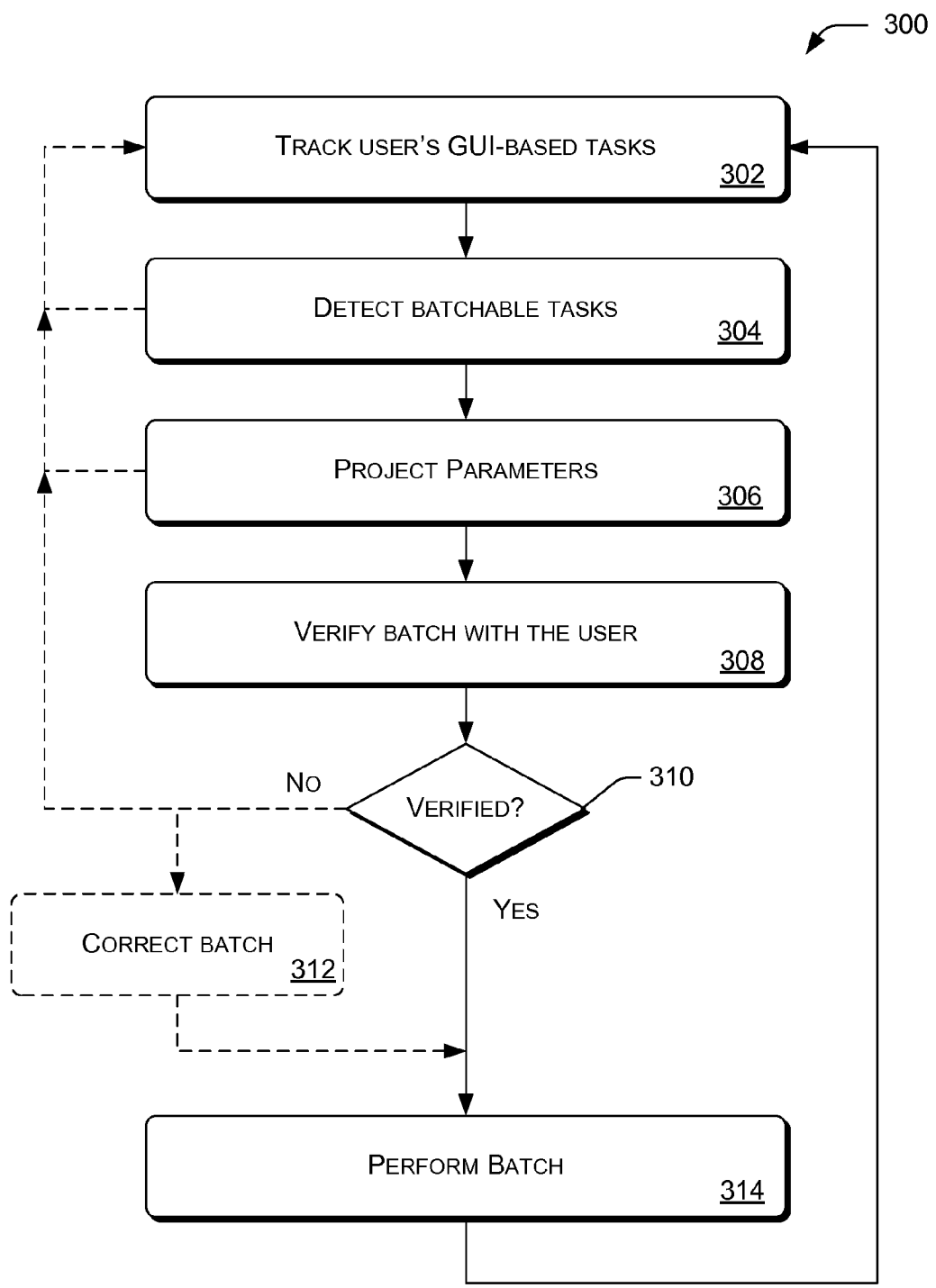
FIGS. 3 and 4 are flow diagrams of one or more example processes, each of which implements the techniques described herein.
Figure 4:
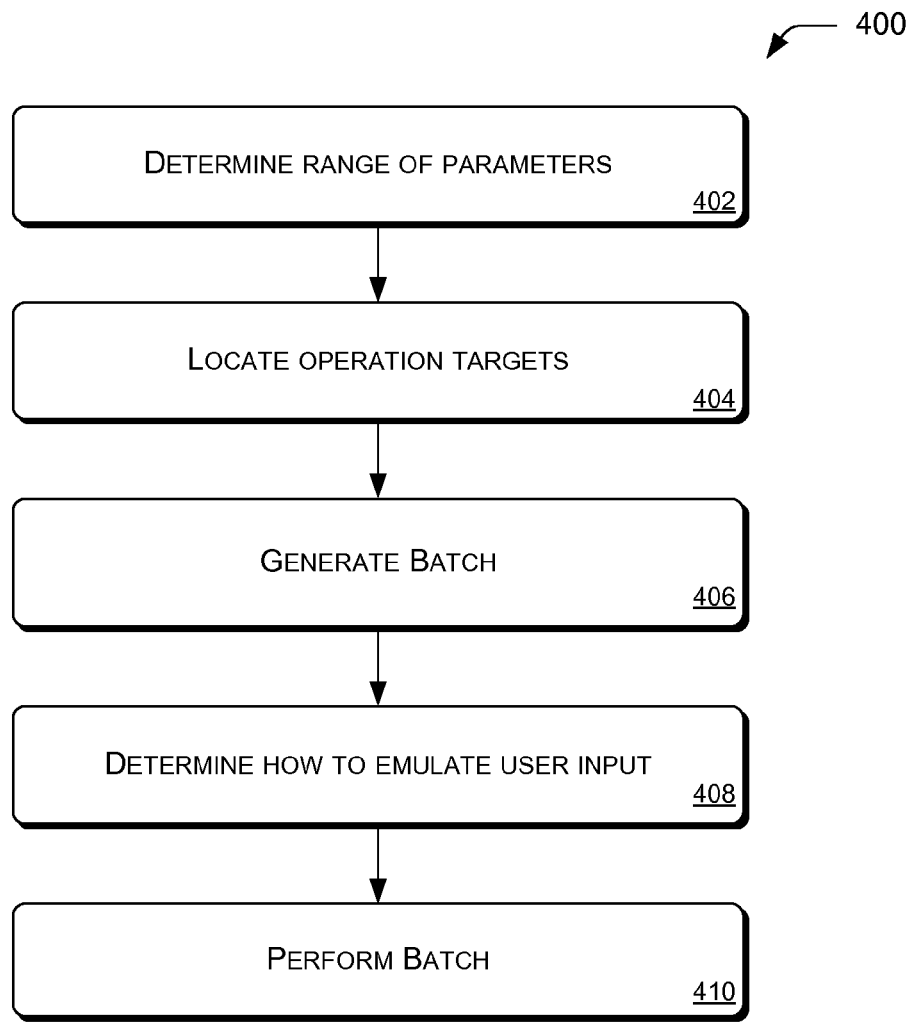

FIGS. 3 and 4 are flow diagrams illustrating example processes 300 and 400 that implement the techniques described herein for auto-batching GUI-based tasks. These processes are each illustrated as a collection of blocks in a logical flow graph, which represents a sequence of operations that can be implemented in hardware, software, firmware, or a combination thereof. In the context of software, the blocks represent computer instructions stored on one or more computer-readable storage media that, when executed by one or more processors of such a computer, perform the recited operations. Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

FIG. 3 illustrates the example process 300 for auto-batching GUI-based tasks. The process 300 is performed, at least in part, by a computing device or system, which includes, for example, the computing system 102 of FIG. 1. The computing device or system is configured to facilitate auto-batching of GUI-based tasks within the context of a GUI-based environment. The computing device or system so configured qualifies as a particular machine or apparatus.

As shown here, the process 300 begins with operation 302, where the computing device tracks the GUI-based tasks or actions performed by the user as part of a GUI-based OS environment. This operation is the default or baseline operation performed by the process. The tracking includes monitoring, pre-processing, and recording the user's GUI-based tasks.

As part of operation 302, the computing device tracks the GUI-based tasks of the user within the context of the GUI-based environment. The computing device detects and captures user input as discrete tasks or actions performed by the user via a graphical user interface. This may be accomplished, for example, by having a hook that is running in cooperation with the OS for identifying the GUI-elements of the OS or GUI-based application.

In addition, the computing device converts the captured tasks into a pre-defined format, such as the operation-record format already discussed. Then, the components of the formatted captured tasks are parsed, and portions are labeled as being invariant or variant relative to other tasks performed by the user. That is, the computing device parses and labels each of the tracked GUI-based tasks into an invariant portion and one or more variant portions, wherein the invariant portion of like tasks do not differ between like tasks and the variant portions of like tasks differ between like tasks. Herein, the invariant portions of a task are called logkeys and the variant portions are called parameters.

At operation 304, the computing device detects batchable tasks. The computing device examines the invariant portion of each task of a sequence of GUI-based tasks and detects, in the sequence, a repeated sub-sequence of tasks having a common pattern of invariant portions.

By comparing the invariant portions of tasks, the computing device determines whether the user is manually performing a repeated pattern of like tasks. As indicated by the dashed arrow, operation 304 returns back to the baseline tracking operation 302 until a repeated pattern is detected. Conversely, once a repeated pattern is detected, this process proceeds to the next operation, which is 306.

At operation 306, the computing device anticipates one or more GUI-based tasks not-yet-performed by the user. To do this, the computing device sets the values of the parameters and thereby effectively predicts the parameters of the future operations in the anticipated batch. Based, at least in part, upon known pre-defined, user-customized, and/or user-defined sequences of parameters, the computing device projects what the next parameters will be for the next operations that the user has yet to perform. As indicated by the dashed arrow, this operation returns back to the baseline tracking operation 302, if no appropriate parameter sequence is found in order to project the parameters of the detected pattern. Conversely, once the appropriate parameters are projected, this process proceeds to the next operation, which is 308.

At operation 308, the computing device verifies with the user that the one or more anticipated GUI-based tasks match forthcoming GUI-based tasks that the user intends to perform. To do this, the computing device verifies that the projected parameters accurately predict the actions the user was intending to perform next. This may be accomplished by demonstrating the next actions for the user and asking the user to confirm. Alternatively, this may be accomplished by asking the user to follow the demonstrated actions with user input.

At operation 310, the computing device receives an indication from the user, during the verification process, as to whether the parameters of the demonstrated actions are accurate. If verified, the process 300 proceeds to operation 314. If not verified, the process 300 may return to operation 302 to track the user's tasks again. A failure of the user to respond within a defined period (e.g., 5 seconds) may be presumed to be non-verification. Alternatively, the user may be offered an opportunity to correct a non-verified projection. In this instance, the process 300 may proceed to operation 312 for the user to correct the batch.

At operation 312, the user corrects or adjusts the parameter sequence used by operation 306 to match the pattern that the user intends to use. By utilizing the user-provided or user-corrected parameter sequence, this operation may perform the projections of operation 306. From here, the process 300 may proceed to operation 314.

At operation 314, the computing device performs a batch of the verified GUI-based tasks, visually simulating a user providing input in performing the GUI-based tasks of the batch. In other words, the computing device performs the batch based upon the verified or corrected projections. FIG. 4 provides more details about how that is done. Once the batch is performed, the process 300 returns back to baseline operation 302 to continue to track the user's GUI-based tasks.

FIG. 4 illustrates the example process 400 for auto-batching GUI-based tasks. The process 400 is performed, at least in part, by a computing device or system, which includes, for example, the computing system 102 of FIG. 1. The computing device or system is configured to facilitate the auto-batching of GUI-based tasks within the context of a GUI-based environment. The computing device or system so configured qualifies as a particular machine or apparatus.

As shown here, the process 400 begins with operation 402, where the computing device detects and confirms a range of parameters. Based upon context, the computing device may detect a range, or upper/lower limits, of the parameters. After detecting the upper and/or lower limit of the parameters, the computing device may ask the user to confirm this detected limit.

At operation 404, the computing device locates the target elements of the operations of the generated batch in order to be able to later mimic the user performing the batch tasks. The computing device maps the IDs of the detected repetition pattern to their logkeys. The computing device then combines the predicted parameters with the mapped logkeys to produce predicted operation records. The predicted operation records may be formatted in accordance with the operation-record format already discussed.

Using the predicted operation records, at operation 406, the computing device generates a predicted operation sequence, which may be called the predicted batch. The generated batch may be stored in the memory 114 or storage system 110 of the computer device 102.

At operation 408, for each GUI-based task of a predicted operation record, the user-input emulator 220 determines how to emulate a user controlling the input. In this way, while the batch is being automatically performed, it appears that a user is controlling the input. For example, it appears that the user is moving the cursor on-screen and clicking buttons.

At operation 410, the computing device performs the predicted batch and does so without user interaction or intervention. That is, it does so automatically.

CONCLUDING NOTES

As used in this application, the terms "component," "module," "system," "interface," or the like, are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of example, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture, using standard programming and/or engineering techniques to produce software, firmware, hardware, or any combination thereof, to control a computer to implement the disclosed subject matter. The term "article of manufacture," as used herein, is intended to encompass a computer program accessible from any computer-readable device, carrier, or media.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

As used in this application, the term "or" is intended to mean an inclusive "or" rather than an exclusive "or". For example, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an", as used in this application and the appended claims, should generally be construed to mean "one or more", unless specified otherwise or clear from context to be directed to a singular form.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

We claim:

1. A method that facilitates automatic batching of batchable Graphical User Interface (GUI) based tasks in a GUI-based environment, the method comprising:

tracking GUI-based tasks of a user within a context of the GUI-based environment;

determining whether the tracked GUI-based tasks of the user are batchable;

anticipating one or more not-yet-performed GUI-based tasks;

verifying, with the user, that one or more anticipated GUI-based tasks match forthcoming GUI-based tasks that the user intends to perform;

locating GUI-based targets of the verified GUI-based tasks;

performing a batch of the verified GUI-based tasks, wherein the performing includes visually simulating a user providing input in performing the GUI-based tasks of the batch.

2. A method as recited in claim 1 further comprising storing the tracked GUI-based tasks using a pre-defined format for storing GUI-based tasks.

3. A method as recited in claim 1 further comprising parsing each of the tracked GUI-based tasks into one or more invariant portions and one or more variant portions.

4. A method as recited in claim 1 further comprising parsing each of the tracked GUI-based tasks into an invariant portion and one or more variant portions, wherein the invariant portion of like tasks does not differ between like tasks and the variant portions of like tasks differ between like tasks.

5. A method as recited in claim 4, wherein the determining comprises:

examining the invariant portion of each task of a sequence of GUI-based tasks;

detecting, in the sequence, a repeated sub-sequence of tasks having a common pattern of invariant portions.

6. A method as recited in claim 4, wherein the determining comprises:

examining the invariant portion of each task of a sequence of GUI-based tasks;

detecting, in the sequence, an adjacent and repeated sub-sequence of tasks having a common pattern of invariant portions.

7. A method as recited in claim 5, wherein the anticipating comprises setting values of variant portions of the anticipated not-yet-performed GUI-based tasks.

8. A method as recited in claim 5, wherein the anticipating comprises:

selecting one or more defined sequences of values of variant portions of GUI-based tasks;

setting values of the variant portions of the anticipated not-yet-performed GUI-based tasks based upon the selected one or more defined sequences.

9. A method as recited in claim 5, wherein the anticipating comprises:

selecting one or more defined sequences of values of variant portions of GUI-based tasks;

obtaining an upper or a lower limit of the selected sequence;

setting values of the variant portions of the anticipated not-yet-performed GUI-based tasks based upon the selected one or more sequences, wherein the upper or the lower limit of set values is defined by the obtained limit.

10. One or more computer storage media storing processor-executable instructions that, when executed, cause one or more processors to perform operations that facilitate automatic batching of batchable Graphical User Interface (GUI) based tasks in a GUI-based environment, the operations comprising:

determining that tracked GUI-based tasks of a user are batchable;

anticipating one or more not-yet-performed GUI-based tasks based upon the determined batchable GUI-based tasks;

verifying, with the user, that one or more anticipated GUI-based tasks match forthcoming GUI-based tasks that the user intends to perform;

performing a batch of the verified GUI-based tasks, wherein the verified GUI-based tasks of the batch are performed without user interaction.

11. One or more computer storage media as recited in claim 10, wherein the operations further comprise parsing each of the tracked GUI-based tasks into an invariant portion and one or more variant portions, wherein the invariant portion of like tasks does not differ between like tasks and the variant portions of like tasks differ between like tasks.

12. One or more computer storage media as recited in claim 11, wherein the determining operation comprises:
examining the invariant portion of each task of a sequence of GUI-based tasks;
detecting, in the sequence, a repeated sub-sequence of tasks having a common pattern of invariant portions.

13. One or more computer storage media as recited in claim 12, wherein the anticipating operation comprises setting values of the variant portions of the one or more anticipated not-yet-performed GUI-based tasks.

14. One or more computer storage media as recited in claim 12, wherein the anticipating operation comprises:
selecting one or more defined sequences of values of variant portions of GUI-based tasks;
setting values of the variant portions of the anticipated not-yet-performed GUI-based tasks based upon the selected one or more defined sequences.

15. One or more computer storage media as recited in claim 10, wherein the operations further comprise generating the batch of the verified GUI-based tasks to include multiple repetitions of the determined batchable GUI-based tasks based upon the verified one or more anticipated GUI-based tasks.

16. One or more computer storage media as recited in claim 10, wherein the performing operation comprises visually simulating a user providing input that would cause the performed GUI-based tasks of the batch.

17. One or more computer storage media storing processor-executable instructions that, when executed, cause one or more processors to perform operations that facilitate automatic batching of batchable Graphical User Interface (GUI) based tasks in a GUI-based operating system (OS) environment, the operations comprising:
identifying GUI-based tasks of a user that are batchable;
generating a repeated pattern of multiple not-yet-performed GUI-based tasks based, at least in part, upon the identified batchable GUI-based tasks;
performing a batch of the generated GUI-based tasks.

18. One or more computer storage media as recited in claim 17, wherein the identifying operation comprises:
tracking GUI-based tasks of the user within a context of the GUI-based OS environment;
parsing each of the tracked GUI-based tasks into an invariant portion and one or more variant portions, wherein the invariant portion of like tasks does not differ between like tasks and the variant portions of like tasks differ between like tasks;
examining the invariant portion of each task of a sequence of GUI-based tasks;
detecting, in the sequence, a repeated sub-sequence of tasks having a common pattern of invariant portions.

19. One or more computer storage media as recited in claim 18, wherein the generating operation comprises:
selecting one or more defined sequences of values of variant portions of GUI-based tasks;
setting values of variant portions of the anticipated not-yet-performed GUI-based tasks based upon the selected one or more defined sequences.

20. One or more computer storage media as recited in claim 17, wherein the identified GUI-based tasks of the user occur across multiple GUI-based applications in the GUI-based OS environment.

* * * * *